(12) United States Patent
O'Connor et al.

(10) Patent No.: US 11,366,633 B2
(45) Date of Patent: Jun. 21, 2022

(54) AUTOMATIC PLAYBACK TIME ADJUSTMENT

(71) Applicant: AVNERA CORPORATION, Hillsboro, OR (US)

(72) Inventors: Shawn O'Connor, Portland, OR (US);
Eric Sorensen, Portland, OR (US);
Manpreet S. Khaira, Portland, OR (US); Sydney Newton, Portland, OR (US)

(73) Assignee: AVNERA CORPORATION, Hillsboro, OR (US)

( * ) Notice: Subject to any disclaimer, the term of this patent is extended or adjusted under 35 U.S.C. 154(b) by 65 days.

(21) Appl. No.: 16/017,800

(22) Filed: Jun. 25, 2018

(65) Prior Publication Data

US 2019/0012135 A1   Jan. 10, 2019

Related U.S. Application Data

(60) Provisional application No. 62/524,408, filed on Jun. 23, 2017.

(51) Int. Cl.
*G06F 3/16* (2006.01)
*H04R 1/10* (2006.01)
*H04R 5/033* (2006.01)

(52) U.S. Cl.
CPC ............ *G06F 3/165* (2013.01); *G06F 3/167* (2013.01); *H04R 1/1041* (2013.01); *H04R 5/033* (2013.01); *H04R 2460/15* (2013.01)

(58) Field of Classification Search
CPC .... H04R 1/1041; H04R 29/00; H04R 29/001; H04R 3/00; H04R 1/1008; H04R 1/1091; H04R 2460/15; H04R 25/305; H04R 5/033; G10K 2210/1081; G10K 11/178; G10K 11/1781; G06F 3/165; G06F 1/3206; G06F 1/3287; G06F 3/167
See application file for complete search history.

(56) References Cited

U.S. PATENT DOCUMENTS

| 6,118,878 A | 9/2000 | Jones | |
|---|---|---|---|
| 2006/0013079 A1* | 1/2006 | Rekimoto | H04R 29/001 369/30.01 |
| 2006/0285677 A1* | 12/2006 | Souma | H04M 1/6058 379/388.03 |
| 2007/0189544 A1* | 8/2007 | Rosenberg | G11B 27/105 381/57 |
| 2009/0154720 A1 | 6/2009 | Oki | |
| 2009/0226013 A1* | 9/2009 | Burge | H04R 1/1041 381/150 |
| 2011/0007907 A1 | 1/2011 | Park et al. | |
| 2013/0114823 A1* | 5/2013 | Kari | H04R 1/1041 381/74 |

(Continued)

*Primary Examiner* — Fan S Tsang
*Assistant Examiner* — David Siegel
(74) *Attorney, Agent, or Firm* — Lando & Anastasi, LLP (57) ABSTRACT

An apparatus can include an audio playback device configured to provide an audio output to a user, and a controller configured to: receive an initial playback position within the audio output; determine that an off-ear event has occurred; identify a time corresponding to the off-ear event; instruct the audio playback device to pause the audio output at the identified time; and calculate a new playback position within the audio output based at least in part on the identified time.

19 Claims, 6 Drawing Sheets

| Accessory Events | | Play Status Received | | Receive Playback Position | | | | | | Off-Ear Event | Send pause | Rewind playback position | |
|---|---|---|---|---|---|---|---|---|---|---|---|---|---|
| User/ Host Events | Playback begins | | | 1000 | 2000 | 3000 | 4000 | Delay | User Removes Earbuds | | Play Status Paused | | Playback resumes |
| Time(s) | 0 | | | 1 | 2 | 3 | 4 | 5 | 5.5 | 6 | 7 | 8 | 9 | 10 |

←--------Calculated OED rewind duration--------→

400

(56) References Cited

U.S. PATENT DOCUMENTS

| | | | |
|---|---|---|---|
| 2013/0345842 A1* | 12/2013 | Karakaya | H04R 1/1041 |
| | | | 700/94 |
| 2014/0072134 A1 | 3/2014 | Po et al. | |
| 2014/0072135 A1 | 3/2014 | Bajic et al. | |
| 2014/0086425 A1 | 3/2014 | Jensen et al. | |
| 2014/0193133 A1* | 7/2014 | Parambil | H04N 21/44008 |
| | | | 386/230 |
| 2015/0078573 A1 | 3/2015 | Nicholson | |
| 2015/0104031 A1 | 4/2015 | Park et al. | |
| 2015/0124977 A1 | 5/2015 | Srivastava et al. | |
| 2015/0195639 A1 | 7/2015 | Azmi et al. | |
| 2015/0195646 A1 | 7/2015 | Kumar et al. | |
| 2015/0281836 A1 | 10/2015 | Nguyen et al. | |
| 2017/0013345 A1 | 1/2017 | Kumar et al. | |
| 2017/0280223 A1* | 9/2017 | Cavarra | G06F 1/1694 |

\* cited by examiner

FIG. 4

AUTOMATIC PLAYBACK TIME ADJUSTMENT

CROSS-REFERENCE TO RELATED APPLICATIONS

The present application claims the benefit of U.S. Provisional Patent Application No. 62/524,408, which was filed on Jun. 23, 2017 and entitled "AUTOMATIC PLAYBACK TIME ADJUSTMENT," the disclosure of which is hereby fully incorporated herein by reference in its entirety.

TECHNICAL FIELD

This disclosure relates to audio headsets and, more particularly, to methods and systems for controlling audio playback by an audio headset.

BACKGROUND

Many audio headphones or headsets include a feature that detects when the headset is being worn by a user. More specifically, these headsets detect when they are put on by the user, or when they are removed from a user's ears. This detection itself can trigger an action on the playback device, such as automatically pausing music when the user removes their headset, and automatically restarting the music when the user returns the headset for listening.

The decision of whether the headset is currently being worn by a user is typically based on analysis of a metric derived from one or more sensors. Sensor output commonly used to generate the metric include one or more of: proximity/IR light, capacitive sensors, and one or more microphone/audio sensors. Some detection techniques are described in US Patent Publication Number 2017/0013345, entitled OFF-EAR AND ON-EAR HEADPHONE DETECTION, the content of which is incorporated by reference herein.

The metric used for on/off headset detection described in the '345 published application may, in certain circumstances, be noisy and, and thus techniques in the published application describe signal conditioning, such as filtering and/or averaging to make an accurate on/off ear determination. This signal conditioning often adds delay to the decision. For example, it may take 2-3 seconds after the user removes the headset for the music to actually be paused. It might also take 0.5-1 seconds to play music after the user puts on the headset.

If uncorrected, these delays cause the user to miss some audio content. Any audio played after the user physically removes the headset and before the 'pause' command is sent to the playback device will be not be heard by the user.

Embodiments of the invention address these and other limitations of the prior art.

DETAILED DESCRIPTION

After a playback device has determined that an on-ear or off-ear event has occurred, implementations of the disclosed technology may cause the playback device to accurately return to the portion of the audio that was playing when the event occurred. Present devices do not include such a feature, and instead the audio user may miss a portion of the playback audio after the user replaces the headset.

In some embodiments, a signal may be sent to the playback device (for instance: an iOS device, PC, Android phone, or other tablet/smartphones) to "rewind" the audio that was playing for a user after sending the pause command. This may be done using various control interfaces such as Lightning, USB, Bluetooth, etc. The word "rewind" or "rewound" as used in this disclosure means changing or modifying a present indicator of where to begin replaying audio after a user replaces a headset.

In one embodiment, the audio may be "rewound" or reset by a fixed time delay. For instance, one could characterize a "typical" delay and rewind by that amount every time. In the above-described example, an approximate 3 second modification would be sent after an off-ear detection event.

In practice, the on/off decision delay may be influenced by environmental factors and could have a significant amount of variance. These factors might include the ambient/background noise level (microphone), ambient light level (IR), acoustic seal/fit (microphone), product tolerances (IR/microphone/capacitive), or any other factor which affects the decision metric.

To account for the variable delay, it may be desirable to estimate the actual time at which the headset was removed from the user's ear or ears. The difference between the time the headset was actually removed and the time at which the headset informs the playback device to pause will typically be used as the amount of time to 'rewind' the audio.

To estimate the time at which the headset is removed, some historical sensor data may be continually logged. For instance, the previous 5-10 seconds of sensor data may be logged at any given moment. After the headset on/off decision is made based on the slow/conditioned signal, this historical sensor data can be evaluated to estimate the time at which the headset was actually removed from the user's ear or ears. While the sensor data was initially too noisy or unreliable to make a real-time headset on/off decision, the knowledge that the headset was actually removed allows one to draw further conclusions from the historical data and refine the results.

One simple way to implement this is with two thresholds. The sensor data may be used to compute a metric which increases/decreases depending on how strongly the headset is detected on/off ear. Once this metric meets a certain threshold, the headset on/off decision may be made and a play/pause signal may be sent to the playback device. After the decision is made, the historical data can be evaluated to determine when the metric exceeded a lower threshold. Crossing the lower threshold may have been insufficient to determine the headset on/off decision initially, but may be sufficient to estimate the actual time the headset was removed.

Figure 1:
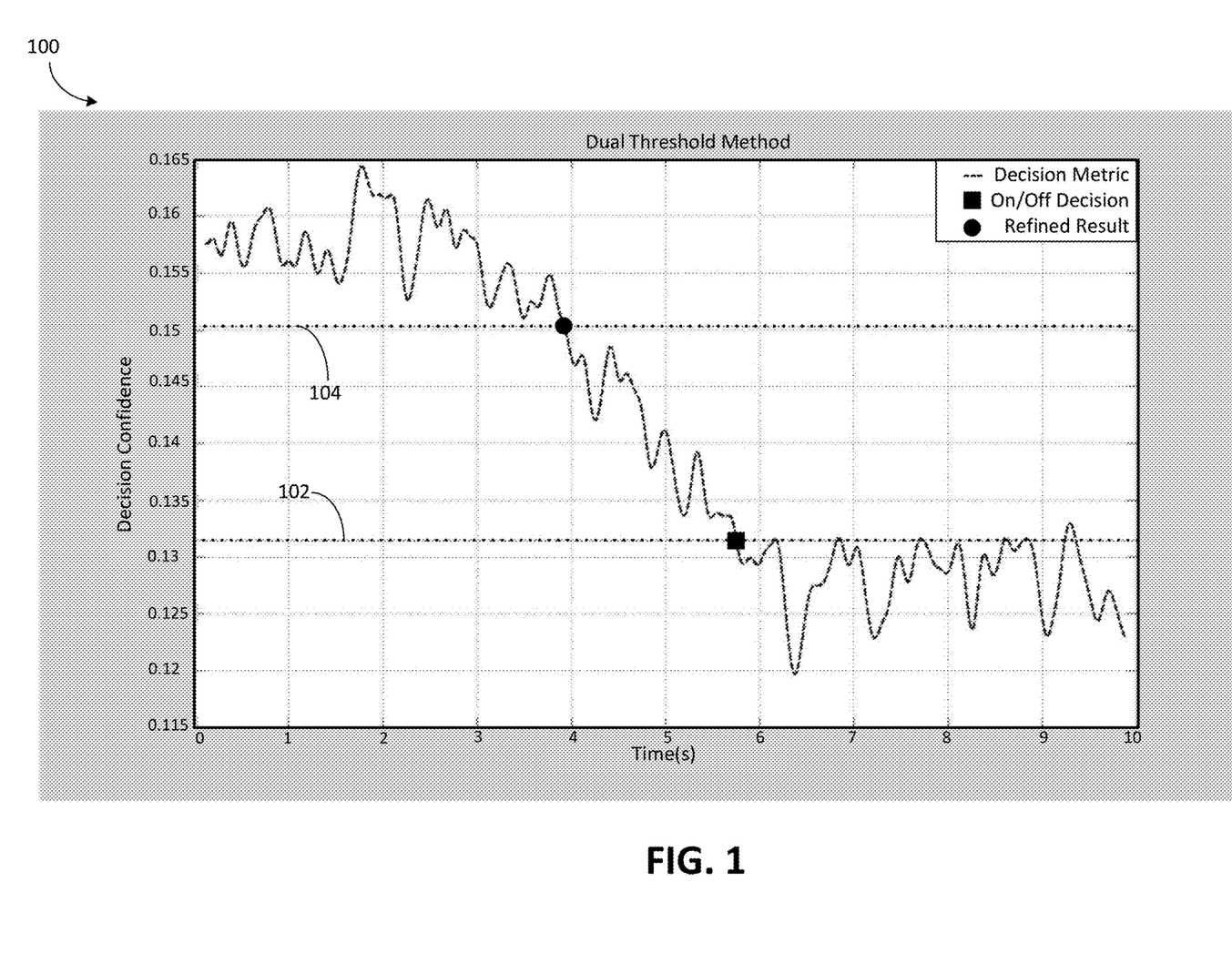
FIG. 1 is a graph illustrating an example of a metric used for determining whether a headset has been removed from a user's ears and a timing adjustment in accordance with certain implementations of the disclosed technology.

FIG. 1 is a graph 100 illustrating an example of a metric used for determining whether a headset has been removed from a user's ears and a timing adjustment in accordance with certain implementations of the disclosed technology. The example shown in FIG. 1 shows a metric with two thresholds 102 and 104. In the example, a lower threshold 102 is used to determine whether an off-ear event occurred. In other words, the off-ear detection was not confident that an off-ear event occurred until the metric reached the lower threshold 102.

After the off-ear detection has occurred, embodiments may be used to refine a time period so that the audio playback will return to the portion of the playback where the user began removing the headset, so that no audio will be lost when the user replaces the headset. For instance, embodiments may include determining that the beginning of the off-ear event occurred closer to the upper threshold 104. In other words, embodiments of the disclosed technology may be used to determine a latency or delay of how long after an off-ear event begins until the detector determines that the off-ear event has actually occurred. In other words, there is a latency associated with the confidence factor of the detection process, and the disclosed implementations may serve to remove such latency.

Figure 2:
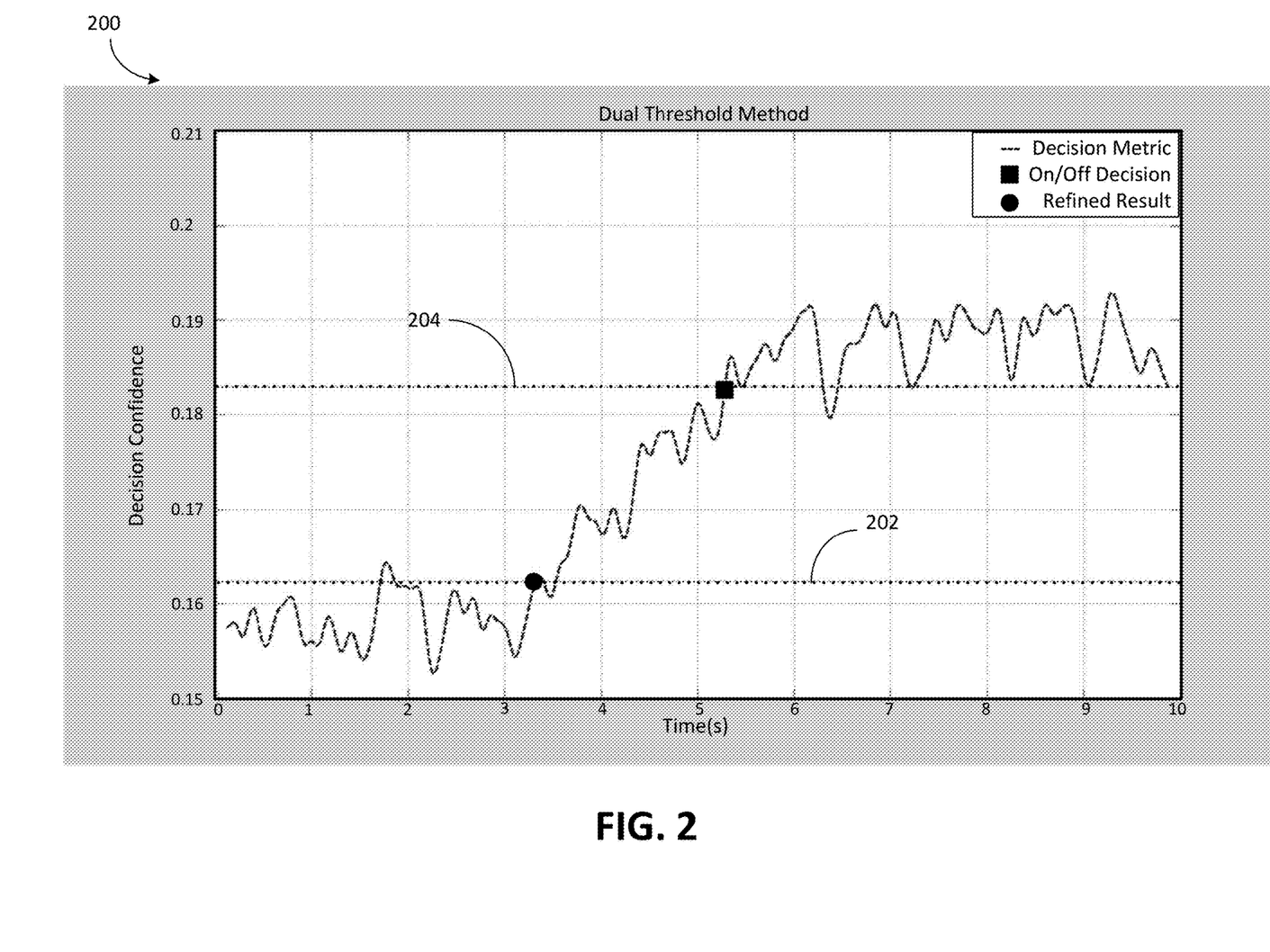
FIG. 2 is a graph illustrating a metric used for determining whether a headset has either been initially placed on or replaced on a user's ears and a timing adjustment in accordance with certain implementations of the disclosed technology.

FIG. 2 is a graph 200 illustrating an example of a situation that is essentially a reversal of the situation illustrated by the graph 100 of FIG. 1. In this example, a higher threshold 204 may be used to make a determination that an on-ear event has actually occurred, while implementations may use a lower threshold 202 to mark the beginning of when the user began putting the headset back on, i.e., the beginning of an on-ear event. In certain implementations, playback may occur once the upper threshold has been reached such that no audio playback will be lost for the user.

Figure 3:
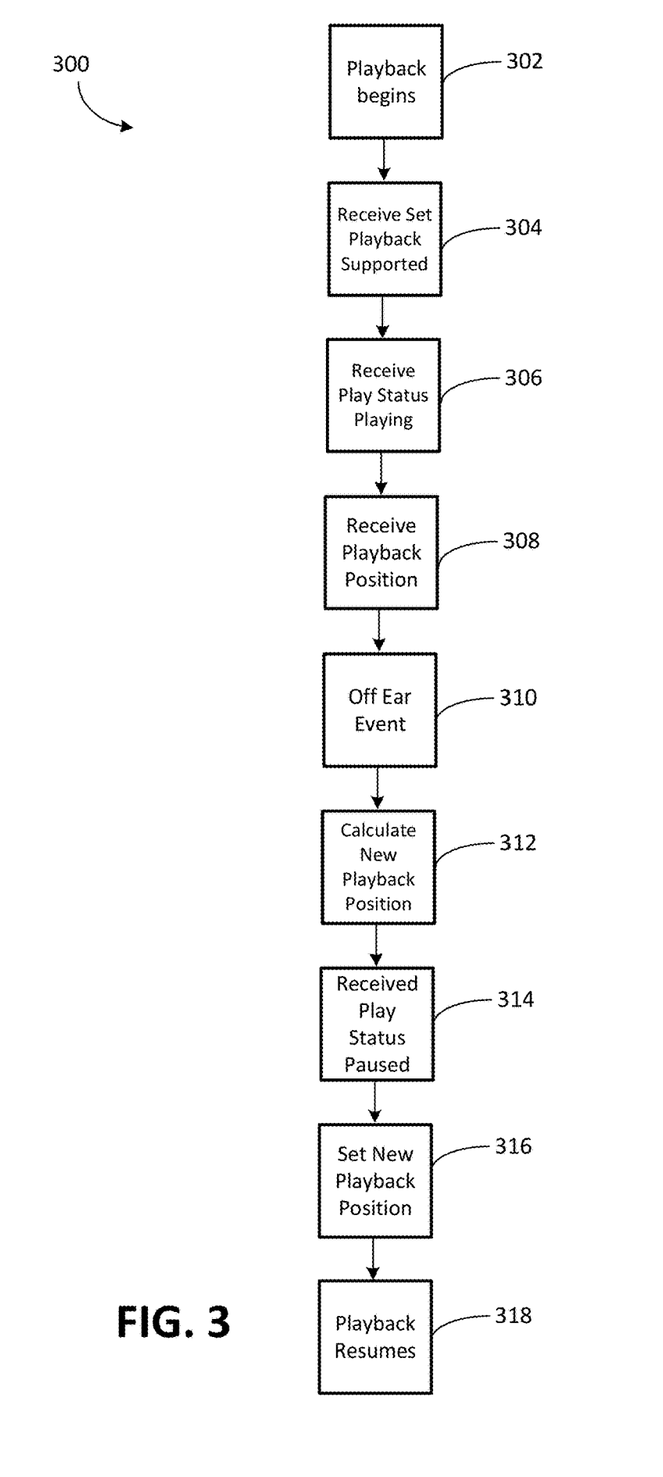
FIG. 3 is a flow diagram illustrating example operations that may be used in accordance with certain implementations of the disclosed technology.

FIG. 3 is a flow diagram 300 illustrating example operations that may be used in accordance with certain implementations of the disclosed technology. At 302, audio playback begins, e.g., by an audio device such as an audio headset or ear buds. At 304, the system receives an indication that there is support for setting playback in accordance with the disclosed embodiments. At 306, the system receives an indication that the play status is set to "playing," e.g., the audio device is playing the audio for the user. At 308, the system receives a playback position, e.g., a position within the recording where playback may be set.

At 310, an off-ear event occurs, such as the user removing the audio headset from his or her head or ear(s), for example. At 312, the system calculates a new playback position, e.g., based at least in part on the off-ear event that occurred at 310. At 314, the system receives an indication that play status is set to "paused." In certain embodiments, instructions to pause playback may be sent to the audio device. At 316, a new playback position is set, e.g., based at least in part on the playback position at 308, such that no audio will be lost to the user once playback resumes. At 318, playback by the audio headset resumes, e.g., from the new playback position that was set at 316.

Figure 4:
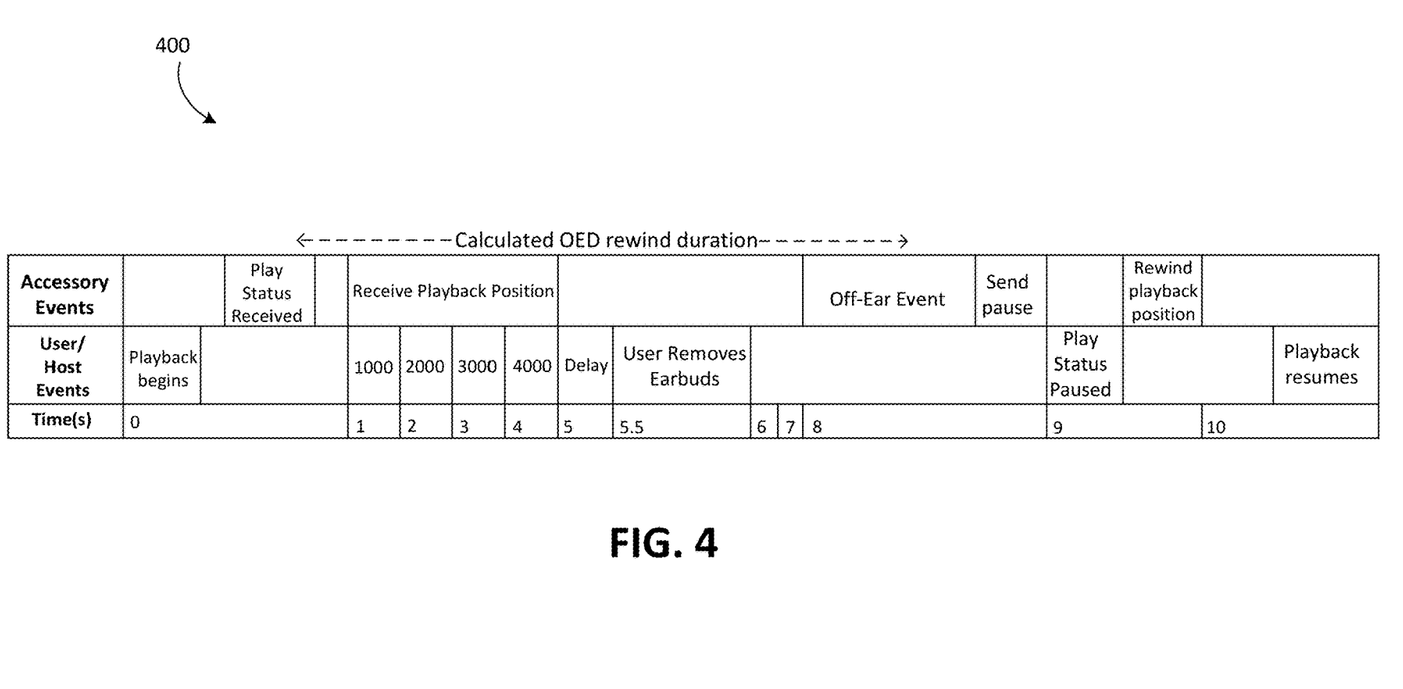
FIG. 4 is an enhanced timing diagram illustrating example steps that may be used in accordance with certain implementations of the disclosed technology.

FIG. 4 is an enhanced timing diagram 400 illustrating example steps that may be used in accordance with certain implementations of the disclosed technology. As indicated in the diagram 400, audio playback begins, e.g., by an audio device such as a headset, and the system receives an indication that the playback has begun. The system further receives a playback position such that, after an off-ear event occurs, e.g., resulting from the user removing earbuds, the system sends a pause instruction to the audio device and then determines a playback position by way of a rewind calculation. In accordance with certain implementations, the rewind calculation can be summarized as follows:

newPosition=max(0,extrapolatedPosition−oedLatency−pauseDelay)

where the extrapolatedPosition value may be estimated using the amount of time that has elapsed since the most recent playback position update. A high precision real-time counter is typically more than sufficient to track this time. The pause delay can be empirically measured for the audio transport and also be adjusted, if necessary. If this is significantly less than the resolution of the OED decision, it can be assumed to be 0. Once the playback position has been determined, the system may instruct the audio device to resume playback at the calculated playback position to ensure that the user experiences no loss of audio information.

The historical sensor data used to estimate the actual headset removal time does not need to be the same data as the data that is used for the on/off decision. In other words, with reference to the example graphs 100 and 200 of FIGS. 1 and 2, respectively, the same metric was evaluated to determine the off-ear detection or on-ear detection (e.g., with regard to the crossing of thresholds 102 and 204) as well as determining the beginning of such an event (e.g., with regard to the crossing of thresholds 104 and 202). Although the same metric can be used, it is not necessary that the same metric be used in all cases. For example, the headset may have microphones used for noise cancellation or voice communication. These microphones may pick up distinct signals as the user handles the headset and takes it off or puts it on.

As an example, the feedback microphone for Automatic Noise Cancellation (ANC) often has a strong peak in energy when a headset is put on, adjusted, or removed by the user. On its own, this data is not usable for a headset on/off decision because the user may touch or handle the headset without removing it. After determining that the headset was actually removed from the user, signals associated with touching or handling the headset within the previous 2-5 seconds of the removal are likely associated with the actual removal of the headset and can be used to refine the estimate of when the headset was removed.

Figure 5A:
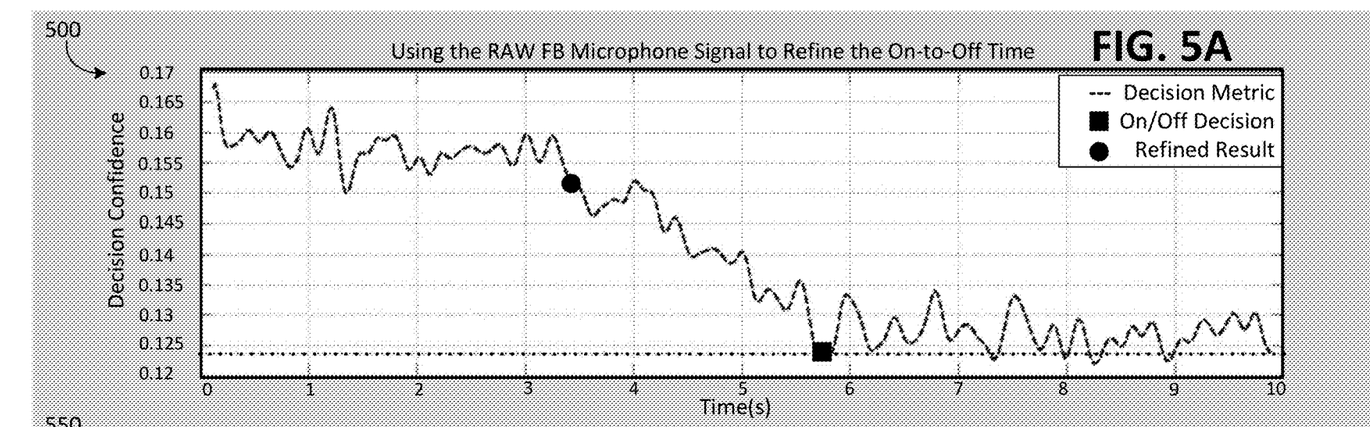
FIGS. 5A and 5B are graphs that together illustrate an example of how the output from a microphone associated with a user may be used as a metric for determining that a headset has been removed from a user's ears, as well as illustrating a timing adjustment in accordance with certain implementations of the disclosed technology.
Figure 5B:
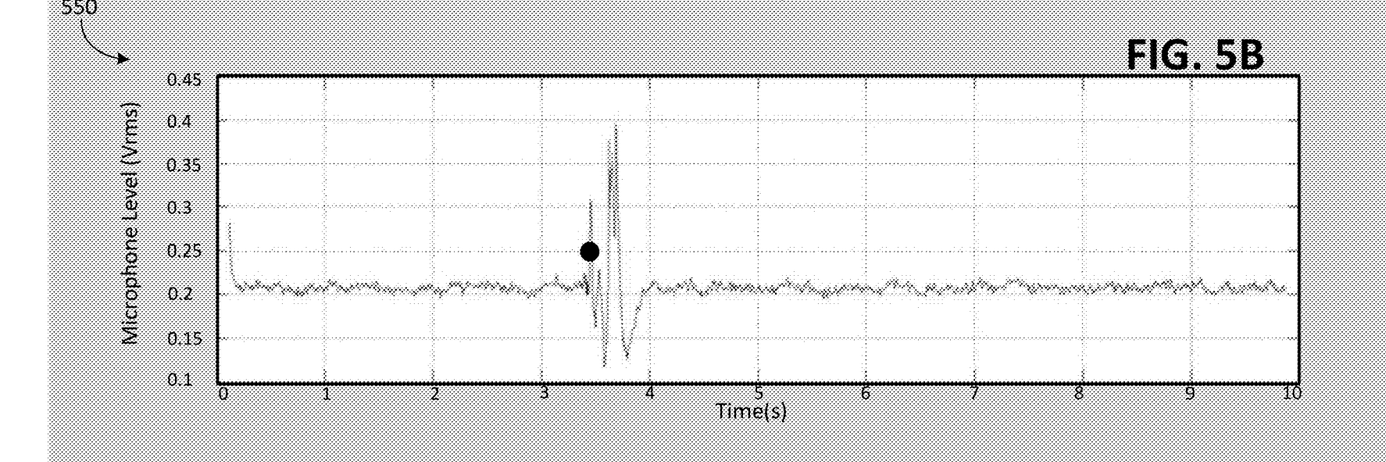

FIGS. 5A and 5B are graphs 500 and 550 that together illustrate an example of how the output from a microphone associated with a user may be used as a metric for determining that a headset has been removed from a user's ears, as well as illustrating a timing adjustment in accordance with certain implementations of the disclosed technology. These graphs 500 and 550 together illustrate an example of a raw FB microphone signal during a transition event as an example of how this might be used to refine the timing.

Figure 6A:
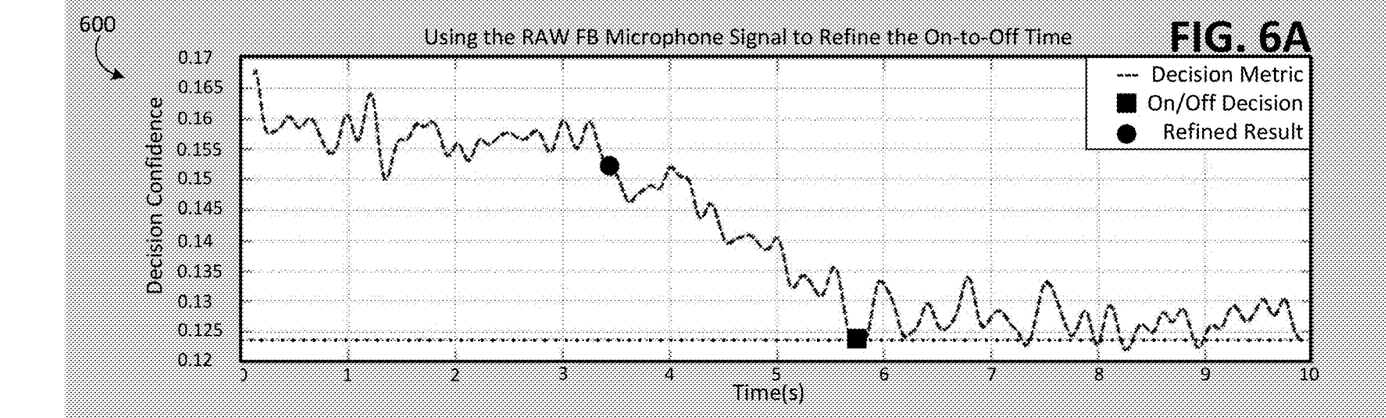
FIGS. 6A and 6B are graphs that together illustrate an example of a method of generating a metric from a microphone associated with a user that may be used as a metric for determining that a headset has been removed from a user's ears, as well as illustrating a timing adjustment in accordance with certain implementations of the disclosed technology.
Figure 6B:
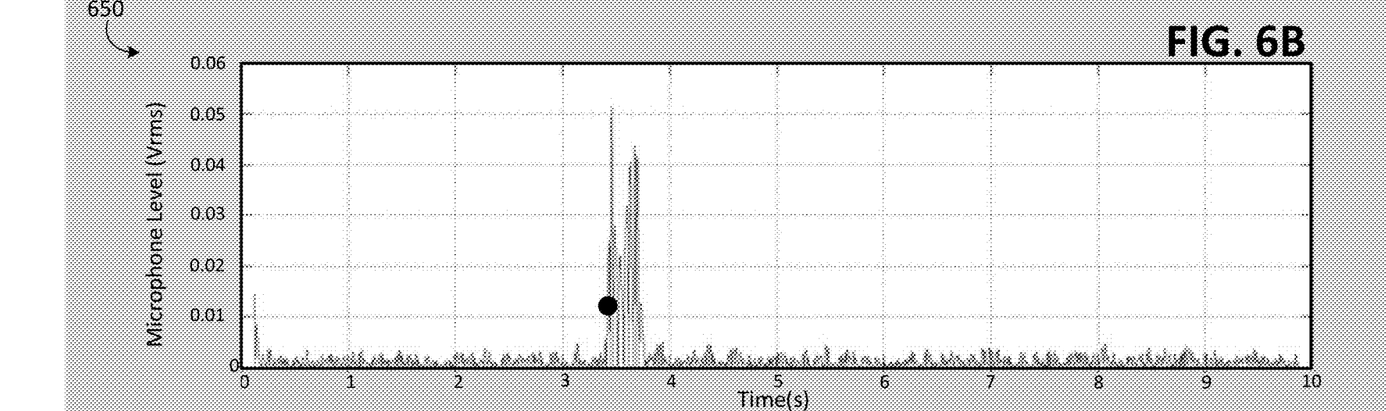

FIGS. 6A and 6B are graphs 600 and 650 that together illustrate an example of a method of generating a metric from a microphone associated with a user that may be used as a metric for determining that a headset has been removed from a user's ears, as well as illustrating a timing adjustment in accordance with certain implementations of the disclosed technology. In this graph, the FB microphone signal illustrated by FIGS. 5A and 5B has been conditioned with a band pass filter and absolute value function.

In other embodiments, if a control interface is not present (e.g., with analog headphones), it may be possible for the system to buffer the audio signal and play it back at a slightly increased rate until the audio "catches up". This would avoid the requirement to have a control interface.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices.

Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects.

In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the disclosure have been illustrated and described for purposes of illustration, it will be understood that various modifications may be made without departing from the spirit and scope of the disclosure.

The invention claimed is:

1. An audio processing apparatus, comprising:
    an audio playback device configured to provide an audio output to a user when worn by the user; and
    a controller configured to
        determine that an off-ear event has occurred indicating that the user is no longer wearing the audio processing apparatus,
        identify a time corresponding to the off-ear event,
        pause the audio output at a first playback position within the audio output responsive to determining the off-ear event has occurred,
        determine a non-zero time delay between the time corresponding to the off-ear event and a time at which the controller paused the audio output, and
        calculate a new playback position within the audio output by rewinding the audio output by the non-zero time delay from the first playback position.

2. The apparatus of claim 1 wherein the controller is further configured to:
    determine that an on-ear event has occurred indicating that the user is wearing the audio processing apparatus; and
    cause the audio playback device to resume playback of the audio output to the user starting from the new playback position within the audio output.

3. The apparatus of claim 1 wherein the controller is configured to determine that the off-ear event has occurred based at least in part on a metric corresponding to the off-ear event crossing at least one confidence threshold.

4. The apparatus of claim 1 wherein the audio playback device includes the controller.

5. The apparatus of claim 1 wherein the audio playback device is a headset or an earbud.

6. A method of audio processing, comprising:
    providing an audio output from an audio playback device to a user wearing the audio playback device;
    determining that an off-ear event has occurred indicating that the user is no longer wearing the audio playback device;
    identifying a time corresponding to the off-ear event;

pausing the audio output at a first playback position within the audio output responsive to the determining that the off-ear event has occurred;

determining a non-zero time delay between the time corresponding to the off-ear event and a time at which the audio output was paused; and calculating a new playback position within the audio output by rewinding the audio output by the non-zero time delay from the first playback position.

7. The method of claim 6 wherein the determining that the off-ear event has occurred includes a metric corresponding to the off-ear event crossing a first confidence threshold.

8. The method of claim 7 wherein the new playback position within the audio output is based at least in part on the first confidence threshold.

9. The method of claim 6 wherein calculating the new playback position within the audio output is further based at least in part on a predetermined period of time.

10. The method of claim 9 wherein the predetermined period of time is between 1-5 seconds.

11. The method of claim 7 wherein the determining that the off-ear event has occurred further includes the metric corresponding to the off-ear event crossing a second confidence threshold.

12. The method of claim 11 wherein the non-zero time delay is calculated based on a difference in time between the metric crossing the first confidence threshold and the metric crossing the second confidence threshold.

13. The method of claim 6 wherein the audio device is a headset and the off-ear event includes the user removing the headset from the user's head.

14. The method of claim 6 wherein the audio device is an earbud and the off-ear event includes the user removing the earbud from the user's ear.

15. The method of claim 6 further comprising:

determining that an on-ear event has occurred indicating that the user is wearing the audio playback device; and causing the audio playback device to resume playback of the audio output to the user starting from the new playback position within the audio output responsive to the on-ear determination.

16. The method of claim 15 wherein the determining that the on-ear event has occurred includes a metric corresponding to the on-ear event crossing a first confidence threshold.

17. The method of claim 16 wherein the determining that the on-ear event has occurred further includes the metric corresponding to the on-ear event crossing a second confidence threshold.

18. The method of claim 15 wherein the audio device is a headset and the on-ear event includes the user positioning the headset back onto the user's head.

19. The method of claim 15 wherein the audio device is an earbud and the on-ear event includes the user positioning the earbud back onto the user's ear.

\* \* \* \* \*